United States Patent [19]

Vassileff

[11] 4,085,060

[45] Apr. 18, 1978

[54] SEQUESTERING COMPOSITIONS

[76] Inventor: Neiko I. Vassileff, 9 Field End La., Eastchester, N.Y. 10709

[21] Appl. No.: 615,989

[22] Filed: Sep. 23, 1975

[51] Int. Cl.$^2$ .................... C02B 1/00; C02B 5/00
[52] U.S. Cl. ....................... 252/180; 210/58; 252/175; 252/DIG. 11; 260/29.6 NR; 260/874
[58] Field of Search ............... 210/54 R, 58; 252/80, 252/82, 175, 180, 181, DIG. 11; 134/2, 22 C, 42; 260/17 R, 29.6 NR, 874, 876 R, 895

[56] References Cited

U.S. PATENT DOCUMENTS

| 2,728,724 | 12/1955 | Gloor | 210/23 |
|---|---|---|---|
| 3,188,289 | 6/1965 | Kahler et al. | 210/58 |
| 3,251,778 | 5/1966 | Dickson et al. | 252/82 |
| 3,288,640 | 11/1966 | Flock | 134/22 |
| 3,331,773 | 7/1967 | Gunderson et al. | 210/58 |
| 3,338,828 | 8/1967 | Clark | 210/52 |
| 3,346,527 | 10/1967 | Lagally | 260/29.2 |
| 3,463,730 | 8/1969 | Booth et al. | 210/58 |
| 3,520,813 | 7/1970 | Hansen et al. | 252/85 |
| 3,617,577 | 11/1971 | King | 210/58 |
| 3,630,937 | 12/1971 | Baum et al. | 252/181 |
| 3,658,710 | 4/1972 | Puckorius et al. | 252/87 |
| 3,663,448 | 5/1972 | Ralston | 252/180 |
| 3,766,077 | 10/1973 | Hwa et al. | 252/180 |
| 3,790,610 | 2/1974 | Lum et al. | 260/429 J |
| 3,791,978 | 2/1974 | Krueger et al. | 252/180 |
| 3,806,485 | 4/1974 | Frisque | 260/29.6 |
| 3,835,084 | 9/1974 | Azorlosa et al. | 260/29.6 NR |
| 3,879,288 | 4/1975 | Siegele | 210/58 |
| 3,890,228 | 6/1975 | Hwa et al. | 210/58 |
| 3,928,196 | 12/1975 | Persinski et al. | 210/58 |
| 3,957,904 | 5/1976 | Isaoka et al. | 260/856 |
| 3,962,110 | 6/1976 | Tate | 252/181 |

Primary Examiner—P.E. Willis, Jr.
Attorney, Agent, or Firm—Jacobs & Jacobs

[57] ABSTRACT

Sequestering compositions are described which utilize two water dispersible polymers, the first having pendant carboxy groups and the second containing hydroxy, amino or imino groups within the polymer. The compositions sequester various metals, are inexpensive to prepare and are easily handled and recovered. A representative embodiment is a mixture of polyacrylic acid and polyethyleneimine. Additional chelating agents can be present.

24 Claims, No Drawings

SEQUESTERING COMPOSITIONS

DETAILED DESCRIPTION

The present invention pertains to a novel sequestering composition which is inexpensive to prepare, demonstrates excellent sequestering properties for metals, and is easily handled and amenable to recovery.

Sequestering and chelating agents are well known and widely used in agriculture, metal finishing, metal refining, textiles, water treatment, and in various other segments of the chemical industry. For example, such agents are employed to supply micronutrients to plants, to control or enhance certain reactions, in acid pickling, etching, electroplating and metal finishing, for purification and separation of relatively expensive metals, in the rubber industry in the preparation of styrene-butadiene rubber, in dyeing and scouring of textiles and in the secondary recovery of petroleum. Many such chelating agents are known to the art, as for example ethylenediamine tetracetic acid, nitrilotriacetic acid, ethyleneglycol-bis-($\beta$-aminoethyl ether)-N,N-tetracetic acid, diethylenetriamine pentacetic acid, N-hydroxyethylethylenediamine triacetic acid, N,N'-dihydroxyethylglycine, gluconic acid, heptogluconic acid and the like. All of these known agents are characterized by the presence of polydentate groups which are capable of forming a metal-ligand bond so as to result in the formation of an internal chelate ring. Because of the presence of multifunctional groups in many of these chelating agents, their preparation is often difficult or at least expensive.

The present invention pertains to a novel composition which is capable of sequestering metal ions and yet which employs relatively inexpensive starting materials. In particular, the present invention pertains to a mixture of at least two different polymers, both of which are water dispersible or hydrophilic. The first polymer is characterized by the presence of pendant carboxylic acid groups as exemplified by polyacrylic acid, polymethacrylic acid, copolymers of acrylic and methacrylic acid and copolymers of maleic anhydride which have been hydrolyzed. The molecular weight of this component can vary widely, from below 2,000 to 60,000 or higher. Naturally since water dispersibility is desirable in most instances, lower molecular weight material is preferred. The second component is a water dispersible polymer containing amino groups, imino groups, hydroxy groups, and/or ether groups. A wide variety of such polymers are known, as for example polyethyleneimine, polyacrylamide (including copolymers of acrylamide), cellulose ethers and related products such as carboxymethylcellulose, hydroxyethylcellulose, hydroxypropylcellulose, methylcellulose and ethylcellulose, ethyleneoxide polymers and copolymers, polyvinyl alcohol, polyvinyl pyrrolidone, starch and modified starch derivatives. Here again, the molecular weight can vary widely, from as low as 600 to as high as 60,000, the principal consideration being the maintenance of the polymer's hydrophilic properties.

The ratio of each component to the other can vary widely, with from 5 to 95% of one polymer with the balance (95 to 5%, respectively) of the other polymer. Generally, the ratio will be between 30 to 70% of one polymer to the other and preferably the amounts of the two polymers will be about the same.

More than one of either type of polymer may of course be present with the total amounts being appropriately adjusted. In addition, it is often advantageous to combine the mixture of the two or more polymers with a known chelating agent, of which any of the above recited examples are suitable. In this way, superior sequestering properties are obtainable.

The compositions are easily prepared by physically blending the two polymers. In most applications, the mixture is utilized in the form of an aqueous solution and in such cases, the two polymers can be simply added to an appropriate volume of water, usually deionized, or separate solutions of each polymer may be prepared and the two solutions then combined. Where necessary, heat may be applied to accelerate the formation of a suitable solution. Should the amount of material added exceed the solubility at normal temperatures, as evidenced by the formation of solid upon cooling the final solution, the solid can be readily removed through conventional methods such as filtration. In some instances, it is also advantageous to utilize readily soluble salts such as the sodium salt of the first polymer having pendant carboxy groups or the hydrochloride salt of a material such as polyethyleneimine. Likewise, the chelating agent can be added in the form of an appropriate salt; e.g. sodium nitrilotriacetate.

The present compositions effectively sequester a large number of metal ions and are used in substantially the same fashion as known sequestering and chelating agents. Among the metals which are sequestered are copper, calcium, zinc, iron, magnesium, and the like.

The following examples will serve to further typify the nature of this invention but such not be construed as a limitation on the scope thereof, the scope being defined solely by the appended claims.

EXAMPLE 1

40 Grams of polyacrylic acid of a molecular weight of approximately 2,000 is dissolved in 60 ml of deionized water and the pH is then adjusted to approximately 7 through the cautious addition of sodium hydroxide. In a separate vessel, 40 grams of polyethyleneimine of a molecular weight of approximately 1,800 is dissolved in 60 ml of deionized water and the pH is adjusted to about 7 through the cautious addition of hydrochloric acid. The two solutions are heated to about 95° C and slowly combined with thorough mixing. The solution is then allowed to cool to room temperature. Its sequestering value for calcium carbonate is approximately 390 mg/g and that for ferric ion is approximately 450 mg/g, as determined by the method described below.

EXAMPLE 2

Following the procedure of Example 1, 40 grams of maleic anhydride-acrylic acid copolymer of a molecular weight of approximately 60,000 and 40 grams of polyethyleneimine of a molecular weight of approximately 60,000 are combined. The product has a calcium carbonate sequestering value of 360 mg/g and a ferric ion sequestering value of approximately 460 mg/g.

EXAMPLE 3

Equal amounts of polyacrylic acid of a molecular weight of 10,000 and polyethyleneoxide of a molecular weight of 10,000 are slowly added to deionized water at a temperature of approximately 95° C with stirring. The mixture is then allowed to cool to room temperature. The product demonstrates a calcium carbonate sequestering value of 430 mg/g and a ferric ion sequestering value of 710 mg/g.

EXAMPLE 4

5 Grams of polyacrylic acid of an approximate molecular weight of 60,000 and 5 grams of polyvinylpyrrolidone of an approximate molecular weight of 60,000 are intimately mixed in a blender. The product is then dissolved in 15 ml of deionized water at about 90° C and thereafter allowed to cool to room temperature. It demonstrates a calcium carbonate chelation value of 410 mg/g and a ferric ion sequestering value of 670 mg/g.

EXAMPLE 5

5 Grams of acrylic acid-ethylene-maleic anhydride copolymer and 5 grams of polyethyleneimine of a molecular weight of approximately 600 are combined with a total of 15 ml of deionized water at a temperature of between 90° and 95° C. To the hot mixture is then added 2.5 g. of ethylenediamine tetraacetic acid dissolved in approximately 4 ml of deionized water.

EXAMPLE 6

To 100 grams of polyacrylic acid of a molecular weight of approximately 10,000 are added 100 grams of carboxymethylcellulose. The two ingredients are thoroughly blended and then slowly added with stirring to 150 ml of deionized water at a temperature of between 90° and 95° C. Upon cooling, the product shows a calcium sequestering value of 280 mg/g and a ferric ion sequestering value of 550 mg/g. of sequestering agent.

EXAMPLE 7

By substituting 100 grams of hydroxyethylcellulose for carboxymethylcellulose in the procedure of Example 6, there is obtained a sequestering agent which demonstrates a calcium carbonate sequestering value of 335 mg/g and a ferric ion sequestering value of 620 mg/g. Similarly by using a like amount of hydroxypropylcellulose, a final sequestering agent is obtained which demonstrates a calcium carbonate sequestering value of 260 mg/g and a ferric ion sequestering value of 510 mg/g.

EXAMPLE 8

3 Grams of carboxymethylcellulose, 3.5 grams of polyethyleneimine of a molecular weight of approximately 600 and 3.5 grams of polyacrylic acid are intimately blended and then dissolved with stirring in 15 ml of deionized water at a temperature between 90° and 95° C. The mixture is then cooled to room temperature.

EXAMPLE 9

6 Grams of polyethyleneimine of a molecular weight of approximately 1,200 and 8 grams of nitrilotriacetic acid are thoroughly blended. To this mixture is then added 6 grams of polyacrylic acid of a molecular weight of approximately 10,000. This is further blended until a homogeneous mixture is obtained. This blend can be utilized as such or dissolved in approximately 1.5 volumes of water (ml/g).

EXAMPLE 10

The sequestering properties of compositions according to the present invention can be determined by simple titration. Standard solutions containing 40% by weight of the various polymers in deionized water are prepared and equal amounts of these solutions are combined. The calcium value is determined by combining a 10.000 g. sample of the mixture with 85 ml of deionized water and 5 ml of ammonium oxalate (60 g. of ammonium oxalate/liter of deionized water). This solution is titrated with a 50 mg/ml solution of calcium carbonate to the first point of permanent turbidity. Upon reaching an end point, the pH of the solution is checked and if the pH is below 11.0, sufficient 50% sodium hydroxide solution is added to bring the pH above 11.0. If the precipitate dissolves, the titration is continued to permanent turbidity. The values for iron is determined by dissolving a 2 g. sample in 150 ml of deionized water and adjusting the pH to 11.0 with sodium hydroxide. This mixture is heated to boiling and titrated slowly with a 172.2 g./liter solution of ferric ammonium sulfate dodecahydrate (1 ml = 20 mg $Fe^{+++}$), adding the standard solution slowly and allowing any precipitate to dissolve before further addition. The titration temperature is kept above 85° C and the end point is noted when a stable precipitate is formed.

Utilizing the above techniques, the following data are obtained for the indicated sequestering compositions.

| Components | Ca mgCaCO$_3$/g | Fe mgFe$^{3+}$/g |
|---|---|---|
| PAA* (M.W. 2,000) Polyethyleneimine | 390 | 450 |
| PAA (M.W. 10,000) Carboxymethylcellulose | 280 | 550 |
| PAA (M.W. 10,000) Hydroxyethylcellulose | 335 | 620 |
| PAA (M.W. 10,000) Hydroxypropylcellulose | 260 | 510 |
| PAA (M.W. 10,000) Methylcellulose | 255 | 390 |
| PAA (M.W. 10,000) Ethylcellulose | 265 | 410 |
| PAA (M.W. 60,000) Polyvinylpyrrolidone | 410 | 670 |
| PAA (M.W. 10,000) Polyethyleneoxide | 430 | 710 |
| Acrylic acid-Maleic Anhydride Copolymer Polyethyleneimine | 360 | 460 |

*Polyacrylic acid

EXAMPLE 11

Following the techniques described in Example 10, the following sequestering compositions are prepared, the last eight for purposes of comparison, in each case in 15 ml of deionized water.

| Components | Parts by Weight (g) | Ca mgCaCO$_3$/g | Fe mgFe$^{3+}$/g |
|---|---|---|---|
| PAA (M.W. 10,000) | 7.0 | 240 | 150 |
| Polyethyleneimine (M.W. 600) | 3.0 | | |
| PAA (M.W. 10,000) | 8.0 | 180 | 320 |
| Carboxymethylcellulose (low M.W.) | 2.0 | | |
| PAA (M.W. 2,000) | 3.0 | 170 | 444 |
| Hydroxymethylcellulose | 7.0 | | |
| PAA (M.W. 2,000) | 1.0 | 80 | 175 |
| Methylcellulose | 9.0 | | |
| PAA (M.W. 10,000) | 2.5 | 140 | 270 |
| Polyvinylpyrrolidone | 7.5 | | |
| PAA (M.W. 2,000) | 4.0 | 290 | 535 |
| Polyethylene oxide | 6.0 | | |
| PAA (M.W. 2,000) | 10.0 | 130 | 70 |
| PAA (M.W. 10,000) | 10.0 | 90 | 50 |
| PAA (M.W. 60,000) | 10.0 | 60 | 30 |
| Polyethyleneimine (M.W. 600) | 10.0 | 35 | 65 |
| Polyethyleneimine (M.W. 1,800) | 10.0 | 24 | 20 |
| Polyethyleneimine (M.W. 60,000) | 10.0 | 16 | 20 |
| Methylcellulose (low M.W.) | 10.0 | 10 | 95 |
| Methylcellulose (high M.W.) | 10.0 | 12 | 78 |

What is claimed is:

1. A metal sequestering composition capable of forming a stable aqueous solution and comprising a physical mixture of (a) from 5 to 95% by weight of at least one of a first water soluble polymer selected from the group consisting of polyacrylic acid and acrylic acid-maleic anhydride copolymer and (b) as the balance of said mixture, a second weight water soluble polymer which is polyethyleneimine.

2. A composition according to claim 1 wherein said mixture contains from about 30 to about 70% by weight of said first water soluble polymer.

3. A composition according to claim 1 comprising approximately equal amounts of said first and second polymers.

4. An aqueous solution of a composition according to claim 1.

5. A composition according to claim 1 wherein said first polymer is polyacrylic acid.

6. An aqueous solution of a composition according to claim 5.

7. A composition according to claim 1 wherein approximately equal amounts of said first and second polymers are present, and said first polymer is polyacrylic acid.

8. An aqueous solution of a composition according to claim 1 sequestering at least one metal selected from the group consisting of copper, calcium, zinc, iron and magnesium.

9. A composition according to claim 1 including a chelating agent in combination with said mixture, said chelating agent being selected from the group consisting of ethylenediamine tetracetic acid, nitrilotriacetic acid, ethyleneglycol-bis-($\beta$-aminoethyl ether)-N,N-tetracetic acid, diethylenetriamine pentacetic acid, N-hydroxyethylethylenediamine triacetic acid, N,N'-dihydroxyethylglycine, gluconic acid, and heptogluconic acid.

10. An aqueous solution of a composition according to claim 9.

11. An aqueous solution of a composition according to claim 9 wherein said first polymer is polyacrylic acid and said chelating agent is ethylenediamine tetracetic acid.

12. An aqueous solution of a composition according to claim 9 wherein said first polymer is polyacrylic acid and said chelating agent is nitrilotriacetic acid.

13. An aqueous solution of a composition according to claim 9 wherein said first polymer is polyacrylic acid and said chelating agent is ethyleneglycol-bis-($\beta$-aminoethyl ether)-N,N-tetracetic acid.

14. An aqueous solution of a composition according to claim 9 wherein said first polymer is polyacrylic acid and said chelating agent is diethylenetriamine pentacetic acid.

15. An aqueous solution of a composition according to claim 9 wherein said first polymer is polyacrylic acid and said chelating agent is N-hydroxyethylethylenediamine triacetic acid.

16. An aqueous solution of a composition according to claim 9 wherein said first polymer is polyacrylic acid and said chelating agent is N,N'-dihydroxyethylglycine.

17. An aqueous solution of a composition according to claim 9 wherein said first polymer is polyacrylic acid and said chelating agent is gluconic acid.

18. An aqueous solution of a composition according to claim 9 wherein said first polymer is polyacrylic acid and said chelating agent is heptogluconic acid.

19. A metal sequestering composition capable of forming a stable aqueous solution and comprising a physical mixture of (a) from 5 to 95% by weight of a first water soluble polymer which is polyacrylic acid and (b) as the balance of said mixture, a second water soluble polymer which is polyethyleneoxide.

20. A composition according to claim 19 wherein approximately equal amounts of said first and second polymers are present.

21. A composition according to claim 19 wherein said mixture contains from about 30 to about 70% by weight of said first water soluble polymer.

22. An aqueous solution of a composition according to claim 30.

23. A composition according to claim 19 including a chelating agent in combination with said mixture, said chelating agent being selected from the group consisting of ethylenediamine tetracetic acid, nitrilotriacetic acid, ethyleneglycol bis-($\beta$-aminoethyl ether)-N, N-tetracetic acid, diethylenetriamine pentacetic acid, N-hydroxyethylethylenediamine triacetic acid, N,N'-dihydroxyethylglycine, gluconic acid, and heptogluconic acid.

24. An aqueous solution of a composition according to claim 19 sequestering at least one metal selected from the group consisting of copper, calcium, zinc, iron and magnesium.

* * * * *